April 13, 1954   J. A. HERRMANN   2,675,434
TROLLEY DUCT

Filed May 25, 1950   3 Sheets-Sheet 1

INVENTOR
John A. Herrmann
BY
S. Eugene Cychinsky
HIS ATTORNEY.

April 13, 1954  J. A. HERRMANN  2,675,434
TROLLEY DUCT

Filed May 25, 1950  3 Sheets-Sheet 3

INVENTOR
John A. Herrmann
BY J. Eugene Bychinsky
HIS ATTORNEY

Patented Apr. 13, 1954

2,675,434

UNITED STATES PATENT OFFICE 2,675,434

TROLLEY DUCT

John A. Herrmann, Grosse Pointe Farms, Mich., assignor to BullDog Electric Products Co., Detroit, Mich., a corporation of West Virginia Application May 25, 1950, Serial No. 164,247

2 Claims. (Cl. 191—23)

This invention relates to electrical distribution systems and more particularly concerns the duct portion of a trolley duct system.

A particular feature of the present invention is in the provision of a duct for a trolley duct type of electrical distribution system which may be economically manufactured, which comprises a minimum number of parts, and which may be easily maintained in operating condition.

A further feature lies in the provision of a duct, for a system of the character described, in the form of an open bottom channel having transverse insulators, at longitudinally spaced points which support the longitudinally extending bus bars. These bus bars are shielded by insulation material in strip or sheet form or the like, surrounding the bus bars on all sides except the bottom side facing the open side of the channel. The shielding strip is formed to restrict access to the open or exposed surfaces of the bus bar. Such construction, then, is characterized by the use of an open sided channel duct, as distinguished from a duct which is closed on all surfaces except for a narrow slot in one of the sides of the duct.

The duct of the present invention is particularly suitable for use with a trolley such as is described in co-pending application Serial No. 171,588, filed July 1, 1950, and assigned to the same assignee.

These and other features and objects of the present invention may be better understood when described in connection with the appended drawings wherein.

A trolley duct normally includes unit lengths, joined end to end to become an electrical distribution system. One such unit length is shown in Figs. 1—4.

Such unit length includes a casing which may be sheet metal made up of two halves, 40—42 which are arranged to provide an open bottom channel. Each half is of ogee form and has a central flange 43. Flanges 43, 43 may be welded or riveted together, as by rivets 44 passing through rivet holes 45, and some of which may be utilized to receive bolts enabling the duct to be connected to vertical hangers, if desired. In a unit length, each half will project beyond the other half at one of the two ends of the unit length to provide a scarf lap, end-to-end joining means for unit lengths, the joining being effected by passing rivets or bolts thru meeting holes 45 of the meeting flanges 43.

Figure 1:
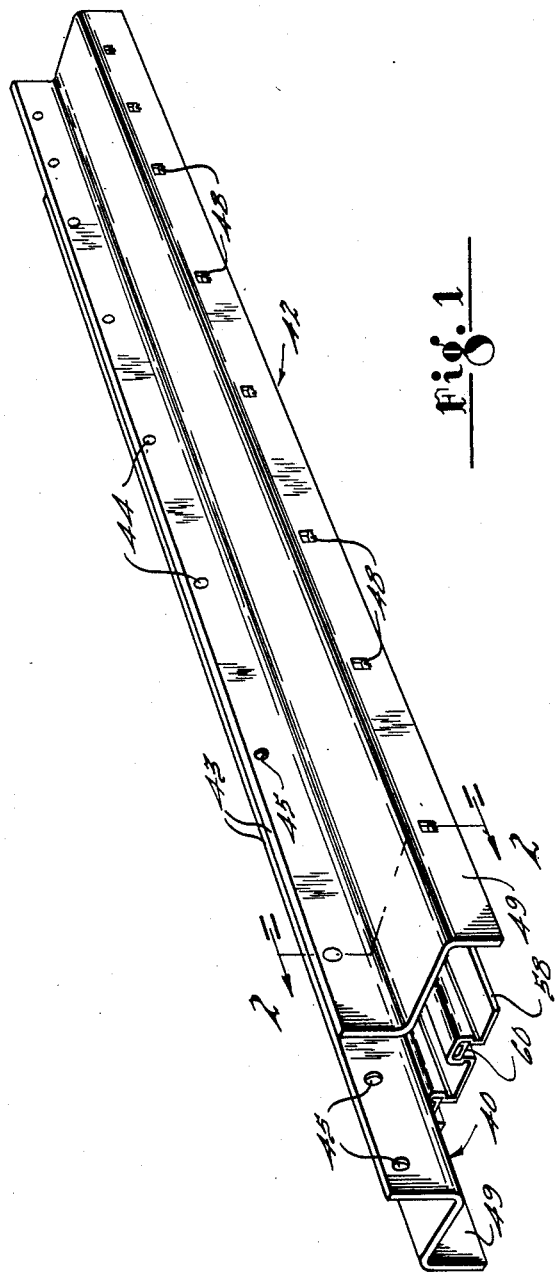
Fig. 1 is a perspective view of a unit length of trolley duct.
Figure 2:
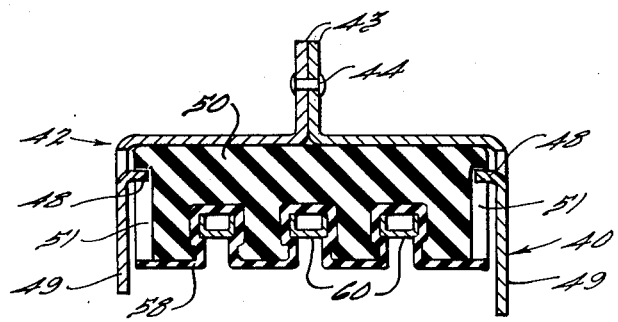
Fig. 2 is a transverse section view on line 2—2 of Fig. 1.

In assembling the casing halves 40—42 to form a channel, the halves of the casing are so positioned that each projects beyond the other at one end, as illustrated in Fig. 1. In this way, a unit length of trolley duct is fabricated and is ready to be joined end to end with additional unit lengths to form a complete run of duct. When two unit lengths are joined end to end, the scarf lap construction enables a casing half 40 of one unit length to be joined to a casing half 42 of the next adjacent unit length by the use of rivets or bolts passed through aligning holes 45 in the flanges 43 of the two unit lengths. This joins the casings end to end.

Figure 4:
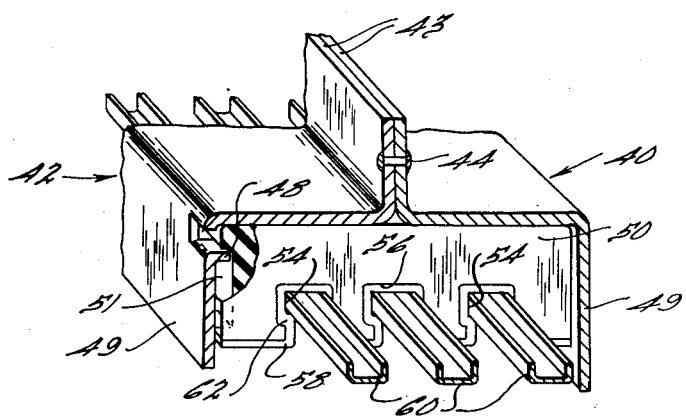
Fig. 4 is a view illustrating the cross section of trolley duct at an insulator support for bus bars.
Figure 3:
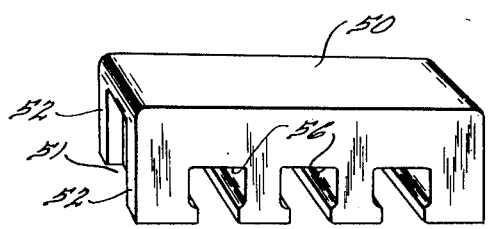
Fig. 3 is a perspective view of an insulator support for bus bars, per se.
Figure 5:
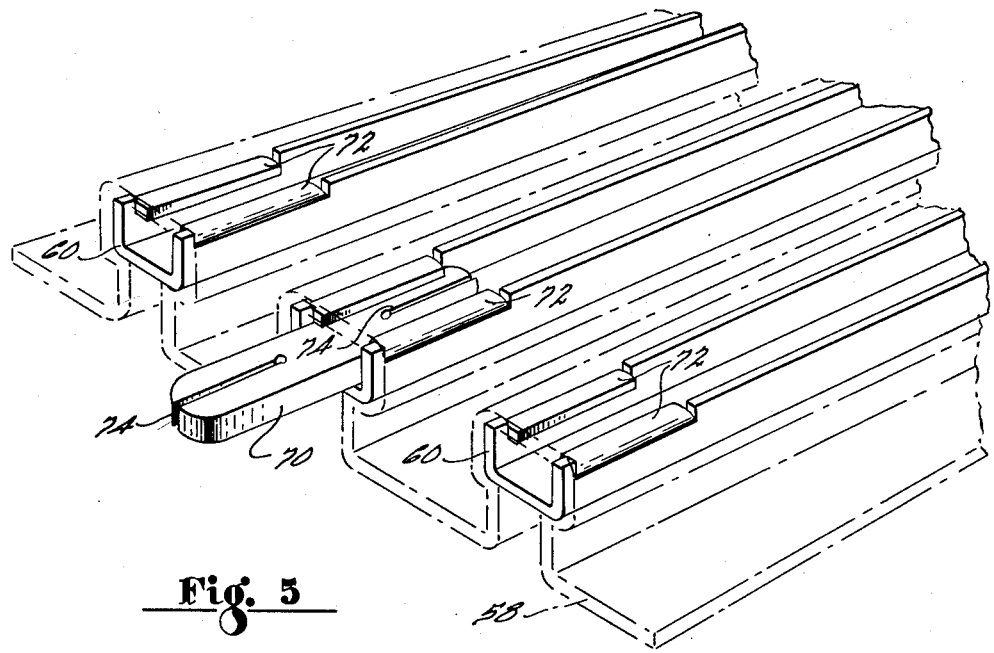
Fig. 5 is a perspective view showing means for coupling bus bars end to end where unit lengths of trolley duct join end to end.

Within the casing and secured thereto by lugs 48 bent inwardly from the vertical side flanges 49 of the halves 40—42, and best visualized in Fig. 4, are longitudinally spaced transverse cleats or blocks 50 of insulation, having grooves 51 in their sides, defining ribs 52 for receiving the lugs 48 of the casing.

Running from end to end of each unit length and formed with ridges 54 interlocking into the sockets 56 of the supporting cleats or blocks 50 is an insulation shield or liner 58 of thin flexible insulation material rigid enough to be shape-sustaining and self-supporting but flexible enough to be bent on longitudinal edges of its ridges 54 to permit U-shaped bus bars 60 of the form shown in Fig. 4 to be snapped into the grooves of ridges 54 and to be held there by shoulders 62 of such grooves of the insulation liner 58.

The assembly of a unit length is effected in the following manner. Three bus bars 60 are snapped into the grooves 54 of the liner 58 when the latter is opened up laterally to a slight extent to permit the bus bars to be disposed in the grooves 54. The bus bars and the liner then form a sub-assembly onto which may be slid, from an end, the required number of the insulator blocks or cleats 50. These are positioned on the sub-assembly 58—60 approximately in the proper locations to correspond with the lugs 48 of the casing halves 40—42. The casing is then separately applied to the sub-assembly of the liner 58, the bus bars 60, and the cleats 50, with the lugs 48 aligning with the grooves 51 of the cleats and with the holes 45 of the two halves aligning and then the halves of the casing may be fastened together.

The mechanical end to end coupling of the bus bars of the two unit adjacent lengths (mentioned above) is effected by the use of coupling bars 70 having ends in each of two end to end abutting bus bars 60. The end of each bus bar 60 is formed with an inwardly bent flange portion 72 overlying the coupling bar 70 and assisting in holding itself and the coupling bar in assembly. Each coupling pin is longitudinally slotted as shown at 74 and is tensioned initially to spread laterally and be compressed when the bus bars are coupled end to end. In this way, the coupling is effected with considerable spring pressure which assists in maintaining mechanical connection and electrical contact between bus bars joined end to end.

The positive alignment of the bus bars end to end effected through the coupling bar 70 is of importance in a trolley duct since the bus bars provide tracks for collectors on the trolleys. The positive alignment of the bus bars enables the trolley to move smoothly.

The positive alignment of the bus bars end to end, effected by the coupling bars 70, also maintains positive alignment of the insulation liners 58 as these are disposed in end abutting relation.

Figure 6:
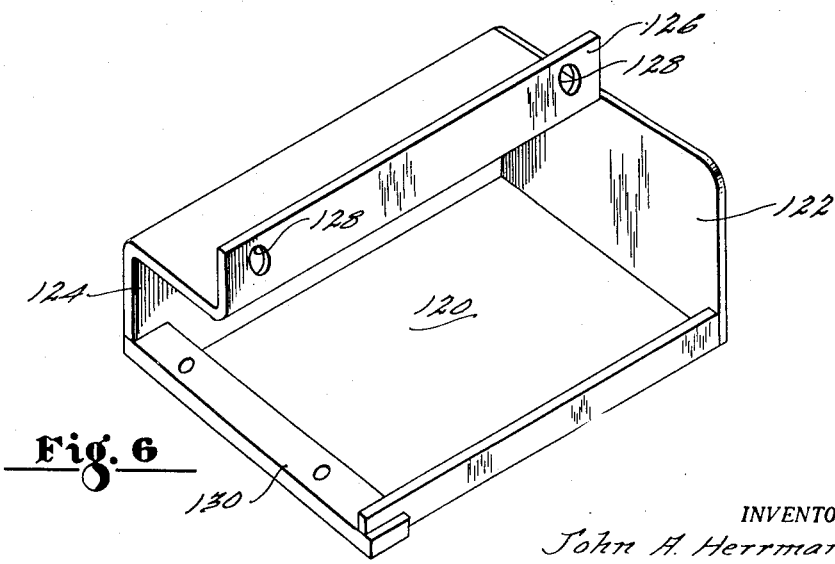
Fig. 6 is a perspective view of an end closer for the trolley duct.

Fig. 6 shows an end closer unit which may be applied as a unit to the open end of any unit length of trolley duct. The end closer is a sheet metal box including a bottom 120, an end wall 122, and a half side section 124 which complements the projecting end of the casing half 40 shown at the left end of Fig. 1. Thus it has a flange 126 with rivet holes 128 to complement the flange 43 and the holes 45 of the casing half 40 at the left end of Fig. 1.

Across the open end of the end closer at the bottom is a fibre bumper bar 130 which forms a stop for the movement of trolleys.

The duct hereof, includes an open bottom channel in which at longitudinally spaced points are the insulator supports or blocks 50 which support longitudinally extending bus bars 60 and that these bus bars, though exposed to the open bottom of the channel, are nevertheless suitably shielded by the insulator strip 58 so that the under surfaces of the bus bars are properly shielded against improper contact.

While the duct hereof is primarily suited for use with movable trolley type current collectors, stationary outlets may also be employed with the duct disclosed.

I claim:

1. In a trolley duct, the combination of a plurality of electrically conducting rails, and an insulating liner of sheet insulation having continuous longitudinally extending ridges formed of the sheet itself to define open grooves in which the rails are disposed, spaced insulator cleats, each having sockets for receiving the ridges of the liner, and an open bottom casing comprising two longitudinally flanged halves of ogee form containing said cleats laterally between them, fastening means for joining said halves thru their cooperating longitudinal flanges, and means on the outer flanges of the halves for retaining said cleats against longitudinal displacement and from downward movement relative to said casing, said means comprising lugs on the outer vertical flanges of said halves cooperating with ribs on the outer vertical surfaces of said cleats each half of the casing projecting beyond the other half at an end of the trolley duct to provide scarf lap joining means for joining casings end to end, these being joined by connection means passing through the central flanges of the central halves, an end closer for such casing comprising a bottom, an end, and a half side and top of ogee form, the other side and top half of the end closer being open to receive the projecting end of the casing half, the end closer having a central top flange meeting the central top flange of the projecting casing half to enable the end closer to be secured to the projecting casing half by means passing laterally through said meeting top flanges.

2. A trolley duct comprising an open bottom casing, insulating supports disposed at spaced intervals in said casing, said insulating supports including rectangular openings having reduced sections opening towards the bottom of said casing, a longitudinally and laterally continuous combined guiding and supporting insulating strip secured to said supports and formed to the contour of the bottom surface of said insulating block including the surface of said rectangular openings and said reduced sections, and a flexible bus bar fully held within each of the rectangular openings and interlocked with said insulating supports and said insulating strip.

References Cited in the file of this patent

UNITED STATES PATENTS

| Number | Name | Date |
|---|---|---|
| 1,398,005 | Colabrese | Nov. 22, 1921 |
| 2,048,378 | Hofner | July 21, 1936 |
| 2,090,725 | Frank et al. | Aug. 24, 1937 |
| 2,096,579 | Frank et al. | Oct. 19, 1937 |
| 2,120,251 | Johnson | June 14, 1938 |
| 2,144,872 | Cruser | Jan. 24, 1939 |
| 2,170,300 | Frank | Aug. 22, 1939 |
| 2,304,924 | Jackson et al. | Dec. 15, 1942 |
| 2,322,799 | Frank | June 29, 1943 |
| 2,358,116 | Wehr | Sept. 12, 1944 |
| 2,481,194 | Bubb et al. | Sept. 6, 1949 |
| 2,495,526 | King | Jan. 24, 1950 |